United States Patent
Le et al.

(10) Patent No.: US 7,600,099 B2
(45) Date of Patent: Oct. 6, 2009

(54) SYSTEM AND METHOD FOR PREDICTIVE EARLY ALLOCATION OF STORES IN A MICROPROCESSOR

(75) Inventors: Hung Qui Le, Austin, TX (US); Dung Quoc Nguyen, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 137 days.

(21) Appl. No.: 11/683,843

(22) Filed: Mar. 8, 2007

(65) Prior Publication Data

US 2008/0222395 A1  Sep. 11, 2008

(51) Int. Cl.
G06F 9/00 (2006.01)

(52) U.S. Cl. .................................... 712/220; 712/E9.03
(58) Field of Classification Search .................. 712/220, 712/E9.03, 233, 239
See application file for complete search history.

(56) References Cited

U.S. PATENT DOCUMENTS

| | | | | |
|---|---|---|---|---|
| 4,992,938 A * | 2/1991 | Cocke et al. | ................. | 712/217 |
| 5,694,565 A | 12/1997 | Kahle et al. | ................. | 395/392 |
| 5,699,538 A * | 12/1997 | Le et al. | ................. | 712/23 |
| 5,778,245 A * | 7/1998 | Papworth et al. | ................. | 712/23 |
| 5,802,340 A * | 9/1998 | Mallick et al. | ................. | 712/218 |
| 5,864,707 A * | 1/1999 | Tran et al. | ................. | 712/23 |
| 5,915,110 A * | 6/1999 | Witt et al. | ................. | 712/239 |
| 5,946,468 A * | 8/1999 | Witt et al. | ................. | 712/218 |
| 6,161,208 A * | 12/2000 | Dutton et al. | ................. | 714/764 |
| 6,233,657 B1 * | 5/2001 | Ramagopal et al. | ................. | 711/146 |
| 6,266,768 B1 * | 7/2001 | Frederick et al. | ................. | 712/220 |
| 6,289,442 B1 * | 9/2001 | Asato | ................. | 712/239 |
| 6,381,689 B2 | 4/2002 | Witt et al. | ................. | 712/215 |
| 6,427,193 B1 * | 7/2002 | Hughes et al. | ................. | 711/146 |
| 6,854,075 B2 | 2/2005 | Mukherjee et al. | ................. | 714/51 |
| 7,000,097 B2 | 2/2006 | Senter et al. | ................. | 712/245 |
| 2001/0001153 A1 | 5/2001 | Palanca et al. | ................. | 712/225 |
| 2002/0141426 A1 * | 10/2002 | Tanaka et al. | ................. | 370/412 |
| 2003/0140195 A1 * | 7/2003 | Borkenhagen et al. | ................. | 711/118 |
| 2003/0182540 A1 | 9/2003 | Burky et al. | ................. | 712/225 |
| 2004/0044881 A1 | 3/2004 | Maier et al. | ................. | 712/218 |
| 2004/0078559 A1 * | 4/2004 | Katayama et al. | ................. | 712/239 |
| 2004/0216091 A1 | 10/2004 | Groeschel | ................. | 717/128 |
| 2005/0066153 A1 | 3/2005 | Sharangpani et al. | ................. | 712/239 |
| 2006/0090035 A1 | 4/2006 | Guthrie et al. | ................. | 711/125 |

* cited by examiner

*Primary Examiner*—Eddie P Chan
*Assistant Examiner*—Driss N Alrobaye
(74) *Attorney, Agent, or Firm*—VanLeeuwen & VanLeeuwen; Diana R. Gerhardt

(57) ABSTRACT

A system and method for predictive early allocation of stores in a microprocessor is presented. During instruction dispatch, an instruction dispatch unit retrieves an instruction from an instruction cache (Icache). When the retrieved instruction is an interruptible instruction, the instruction dispatch unit loads the interruptible instruction's instruction tag (IITAG) into an interruptible instruction tag register. A load store unit loads subsequent instruction information (instruction tag and store data) along with the interruptible instruction tag in a store data queue entry. Comparison logic receives a completing instruction tag from completion logic, and compares the completing instruction tag with the interruptible instruction tags included in the store data queue entries. In turn, deallocation logic deallocates those store data queue entries that include an interruptible instruction tag that matches the completing instruction tag.

14 Claims, 6 Drawing Sheets

SYSTEM AND METHOD FOR PREDICTIVE EARLY ALLOCATION OF STORES IN A MICROPROCESSOR

BACKGROUND OF THE INVENTION

1. Technical Field

The present invention relates to a system and method for predictive early allocation of stores in a microprocessor. More particularly, the present invention relates to a system and method for deallocating a store data queue entry when the store data queue entry includes an interruptible instruction tag that matches a completing instruction tag.

2. Description of the Related Art

Today's processors use a store data queue as a "staging" area to store data into memory. As a processor encounters an instruction to store data, the processor identifies an available entry in the store data queue and stores the instruction's instruction tag (ITAG), along with the data, into the available store data queue entry. The store data queue entry holds the data until the corresponding instruction begins completing, at which time the store data queue stores the data into memory and deallocates the store data queue entry. This deallocation makes the store data queue entry available for other instructions.

A challenge found with existing art is that a processor's pipeline may stall when it attempts to process a store instruction at a time at which the store data queue does not have an available store data queue entry. In this case, the pipeline waits until a store data queue entry is deallocated and, at that time, stores the instruction's tag, along with the data, into the deallocated store data queue entry.

One approach to minimize pipeline stalls is to increase the number of store data queue entries in a store data queue. A challenge found with this approach, however, is that increasing the number of store data queue entries increases a processor's silicon cost and power requirements.

What is needed, therefore, is a system and method to minimize processor stalls by increasing store data queue entry availability without increasing a processor's silicon and power requirements.

SUMMARY

It has been discovered that the aforementioned challenges are resolved using a system and method for early deallocation of a store data queue entry when the store data queue entry includes an interruptible instruction tag that matches a completing instruction tag. An instruction dispatch unit identifies an interruptible instruction (e.g., branch or trap instruction and loads its instruction tag (interruptible instruction tag) into an interruptible instruction tag register. A load store unit retrieves the interruptible instruction tag and includes it in subsequent store data queue entries. When completion logic processes the interruptible instruction, comparison logic compares the completing interruptible instruction's tag (completing instruction tag) with interruptible instruction tags included in the store data queue entries. In turn, deallocation logic deallocates the store data queue entries that include an interruptible instruction tag that matches the completing instruction tag.

An instruction dispatch unit identifies an interruptible instruction, and loads the interruptible instruction's instruction tag into an interruptible instruction tag register. When a load store unit receives a store instruction from the instruction dispatch, the load store unit loads a store data queue entry with 1) the store instruction's instruction tag, 2) the interruptible instruction tag loaded in the interruptible instruction tag register, and 3) the store data. The store data queue holds the store data queue entry until either 1) completion and deallocation logic deallocates the particular store data queue entry for storage, or 2) the store data queue entry flushes out, such as with an incorrect branch prediction.

Completion logic selects a completing instruction and sends its tag (i.e. completing instruction tag) to comparison logic. One portion of the comparison logic compares the completing instruction tag with each instruction tag included in the store data queue. As a result, the store deallocation logic identifies store data queue entries that include the same instruction tag as the completing instruction tag, and requests the store data queue to deallocate those identified store data queue entries accordingly. The store data queue deallocates the store data queue entries and stores their store data in lower level cache memory.

Another portion of the comparison logic compares the completing instruction tag with each interruptible instruction tag included in the store data queue. In turn, the store deallocation logic identifies store data queue entries that include an interruptible instruction tag that matches the completing instruction tag. As such, the store deallocation logic requests the store data queue to deallocate those identified store data queue entries as well, thus deallocating the store data queue entries early.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
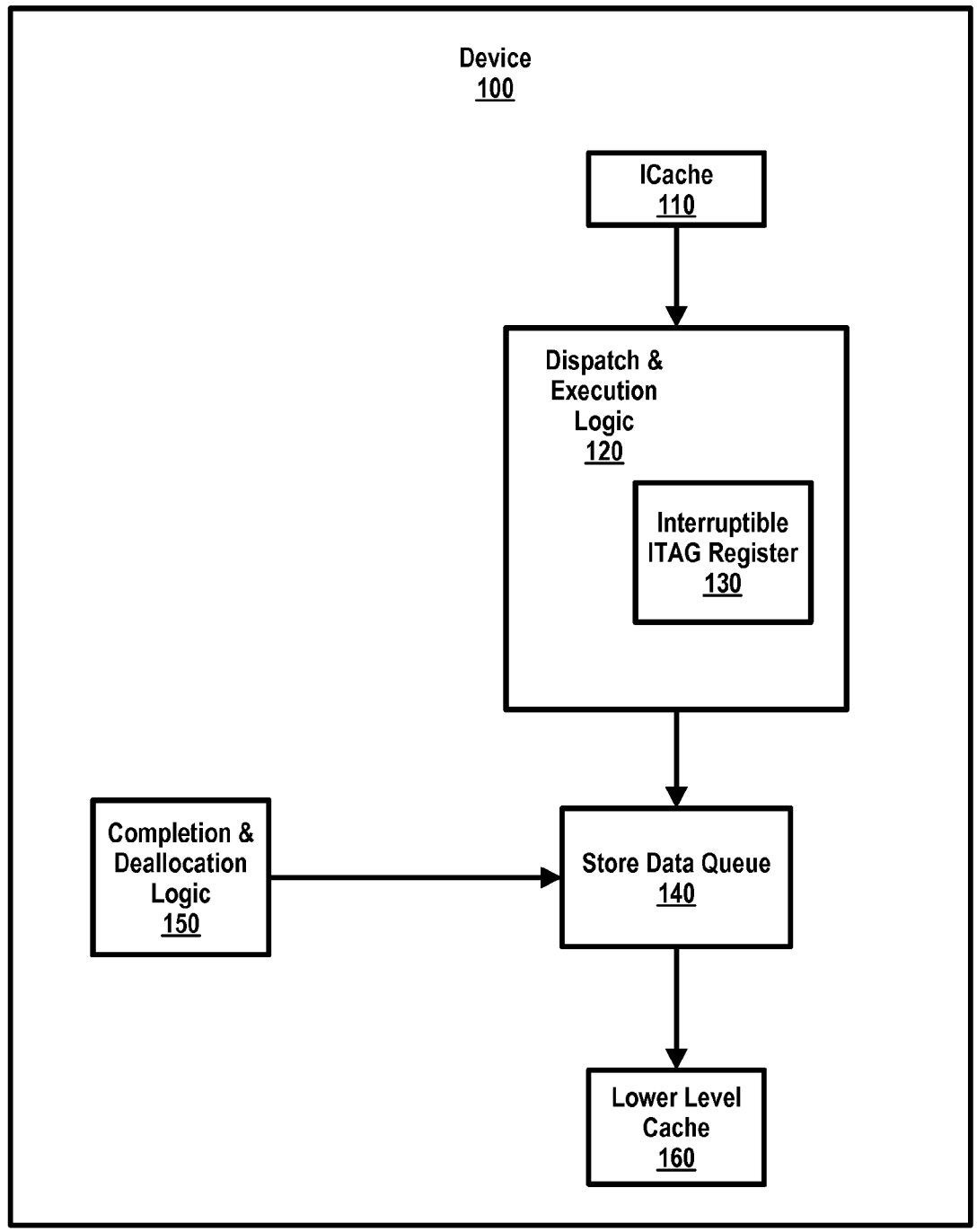
FIG. 1 is a high-level diagram showing a device deallocating store data queue entries early based upon interruptible instruction tags.

FIG. 1 is a high-level diagram showing a device deallocating store data queue entries early based upon interruptible instruction tags. Device 100 includes dispatch and execution logic 120, which retrieves instructions from instruction cache (Icache) 110 to process. As dispatch and execution logic 120 retrieve an instruction from Icache 110, dispatch and execution logic 120 determines whether the instruction is an "interruptible instruction." An interruptible instruction is one whose result may flush out subsequent instructions being processed. For example, a branch instruction is an interruptible instruction because its result may interrupt subsequent instruction processing when an incorrect branch prediction occurs. In this example, when device 100 predicts a branch and starts processing instructions along the predicted branch, device 100 flushes out the instructions when the branch instruction returns a result inconsistent with the prediction.

When dispatch and execution logic 120 identifies an interruptible instruction, dispatch and execution logic 120 stores the interruptible instruction's "instruction tag" (ITAG) in interruptible instruction tag register 130 for later association. For example, when dispatch and execution logic 120 retrieves a store instruction from Icache 110 after the interruptible instruction, dispatch and execution logic 120 loads a store data queue entry (located in store data queue 140) with the store instruction's data, the store instruction's instruction tag, and the interruptible instruction tag included in interruptible instruction tag register 130.

Completion and deallocation logic 150 is responsible for selecting an instruction that is completing and identifying its instruction tag, hereinafter referred to as a "completing instruction tag." In turn, completion and deallocation logic 150 analyze entries in store data queue 140, and deallocate store data queue entries that include an interruptible instruction tag that matches the completing instruction tag. This is due to the fact that since the interruptible instruction is completing and the store data queue entry was not previously flushed out, the store data queue entry is no longer interruptible and, therefore, its store data may be stored in lower level cache 160. As a result, store data queue entries including an interruptible instruction tag matching the completing instruction tag are deallocated early, thus freeing up store data queue entry space for other instructions. Lower level cache 160 may be stored on a volatile or nonvolatile storage area, such as computer memory or a computer hard drive.

Figure 2:
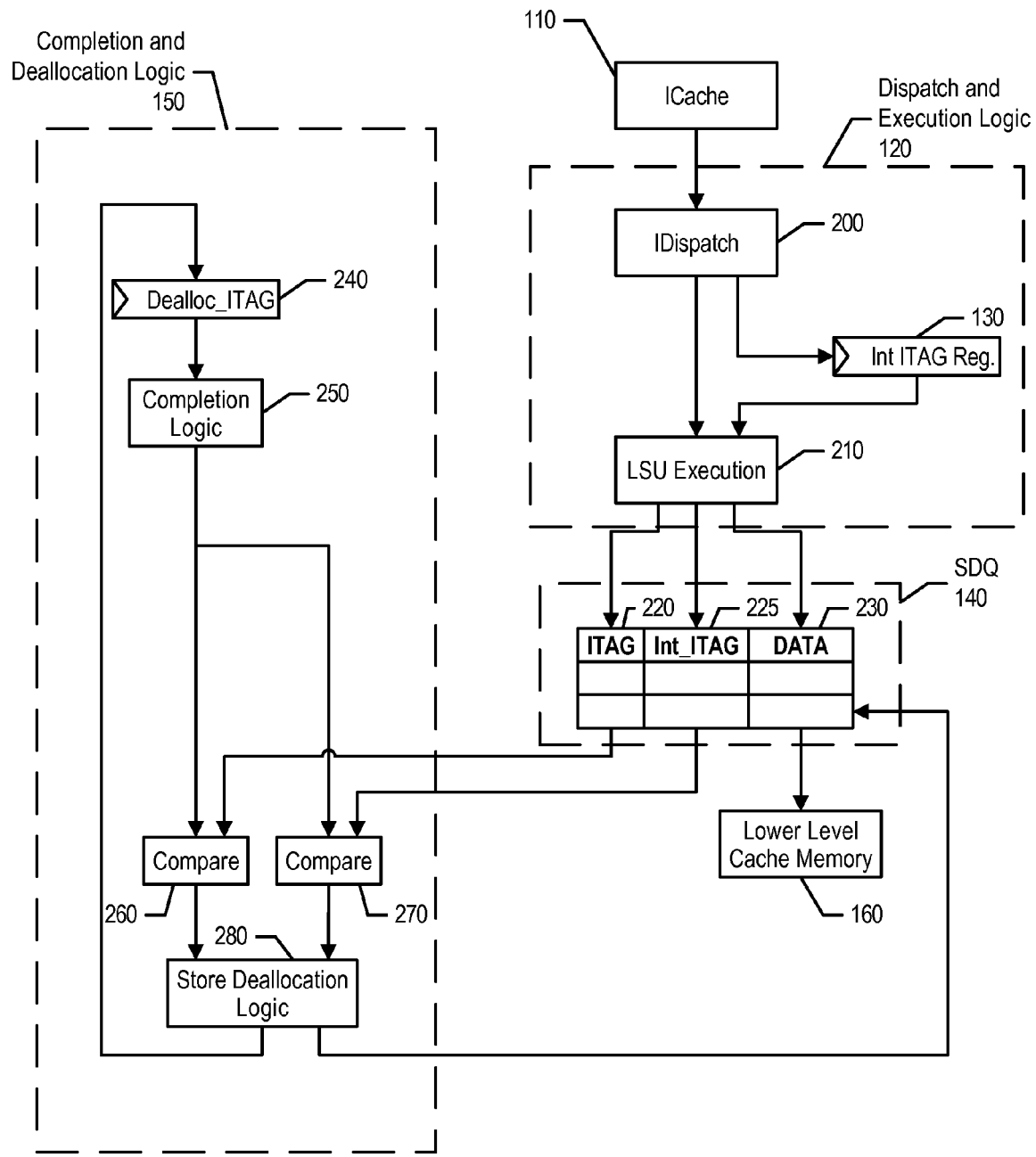
FIG. 2 is a detail diagram showing deallocation logic deallocating store data queue entries that include interruptible instruction tags that match a completing instruction tag.

FIG. 2 is a detail diagram showing deallocation logic deallocating store data queue entries that include interruptible instruction tags that match a completing instruction tag.

Dispatch and execution logic 120 include instruction dispatch (Idispatch) 200, interruptible instruction tag register 130, and load store unit 210. During instruction dispatch, instruction dispatch 200 retrieves an instruction from instruction cache 110. When the instruction is an interruptible instruction, instruction dispatch 200 loads the interruptible instruction's instruction tag into interruptible instruction tag register 130. As such, load store unit 210 loads subsequent store instruction information, along with the interruptible instruction tag, in a store data queue entry located in store data queue 140 (discussed below). Instruction dispatch 200 continues to retrieve instructions from instruction cache 110 and, when it detects a different interruptible instruction, instruction dispatch 200 replaces the interruptible instruction tag included in interruptible instruction tag register 130 with the different interruptible instruction's instruction tag (see FIG. 3 and corresponding text for further details). Instruction cache 110, dispatch and execution logic 120, and interruptible instruction tag register 130 are the same as that shown in FIG. 1.

Load store unit 210 receives instructions from instruction dispatch 200 and, when an instruction is a store instruction, load store unit 210 loads a store data queue entry located in store data queue 140 with the store instruction's instruction tag (stored in field 220), the interruptible instruction tag loaded in interruptible instruction tag register 130 (stored in field 225), and store data (stored in field 230). Store data queue 140 holds the store data queue entry until either 1) completion and deallocation logic 150 deallocates the particular store data queue entry for storage, or 2) the store data queue entry flushes out, such as with an incorrect branch prediction. Completion and deallocation logic 150 is the same as that shown in FIG. 1.

Completion and deallocation logic 150 include deallocation instruction tag register 240, completion logic 250, compare logic 260-270, and store deallocation logic 280. Completion logic 250 selects a completing instruction and sends its tag (i.e. completing instruction tag) to compare 260 and compare 270. Compare 260 compares the completing instruction tag with each instruction tag included in store data queue 140. As such, store deallocation logic 280 identifies store data queue entries that include the same instruction tag as the completing instruction tag, and, in turn, requests store data queue 140 to deallocate those identified store data queue entries accordingly. Store data queue 140 deallocates the store data queue entries and stores their store data in lower level cache memory 160. Lower level cache memory 160 is the same as that shown in FIG. 1.

In addition, compare 270 compares the completing instruction tag with each interruptible instruction tag included in store data queue 140. As such, store deallocation logic 280 identifies store data queue entries that include an interruptible instruction tag that matches the completing instruction tag. In turn, store deallocation logic 280 requests store data queue 140 to deallocate those identified store data queue entries as well, thus deallocating the store data queue entries early.

Figure 3:
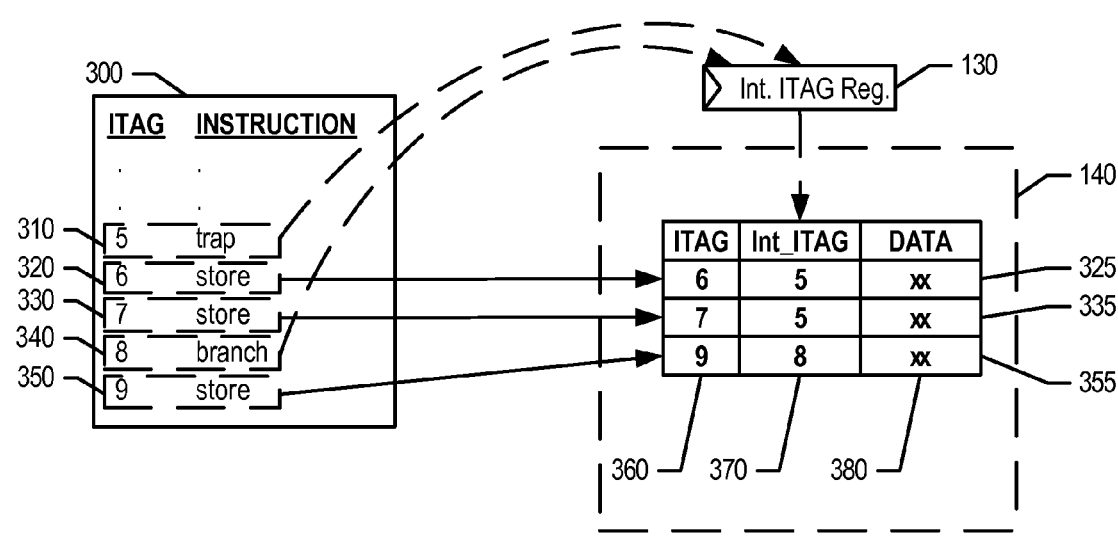
FIG. 3 is a diagram showing interruptible instruction tags loaded into an interruptible instruction tag register that, in turn, associates the interruptible instruction tag to subsequent instructions.

FIG. 3 is a diagram showing interruptible instruction tags loaded into an interruptible instruction tag register that, in turn, associates the interruptible instruction tag to subsequent instructions.

Code 300 includes instructions 310 through 350. As dispatch logic retrieves each of instructions 310 through 350, the dispatch logic determines whether each of the instructions is an interruptible instruction, such as a trap instruction or a branch instruction. When the dispatch logic detects an interruptible instruction, the dispatch logic loads the instruction's instruction tag into interruptible instruction tag register 130. As store data queue entries 315-355 load with subsequent instruction information, the store data queue entries also include the interruptible instruction tag currently loaded in interruptible instruction tag register 130.

Store data queue entries 315-355 each include three fields, which are fields 360, 370, and 380. Field 360 includes the corresponding instruction's instruction tag. Field 370 includes the interruptible instruction tag loaded in interruptible instruction tag register 130 at the time that the instruction was processed. And, field 380 includes the instruction's corresponding store data.

The example shown in FIG. 3 shows that instruction 310 is a trap instruction with a "5" instruction tag. Therefore, the dispatch logic loads "5" into interruptible instruction tag register 130. Next, instruction 320 is a store instruction and, therefore, loads into store data queue entry 325 along with the interruptible instruction tag of "5," which is loaded into interruptible instruction tag register 130. As a result, store data queue entry 325 includes "6" as an instruction tag and "5" as an interruptible instruction tag. The same holds true for instruction 330 that, when loaded into store data queue entry 335, includes "7" as an instruction tag and "5" as an interruptible instruction tag.

When the dispatch logic retrieves instruction 340, the dispatch logic determines that instruction 340 is an interruptible instruction (branch instruction). As such, the dispatch logic loads instruction tag "8" into interruptible instruction tag register 130. When the dispatch logic retrieves instruction 350 and loads it into store data queue entry 355, store data queue entry 355 includes an interruptible instruction tag "8" because it now resides in interruptible instruction tag register 130.

Figure 4:
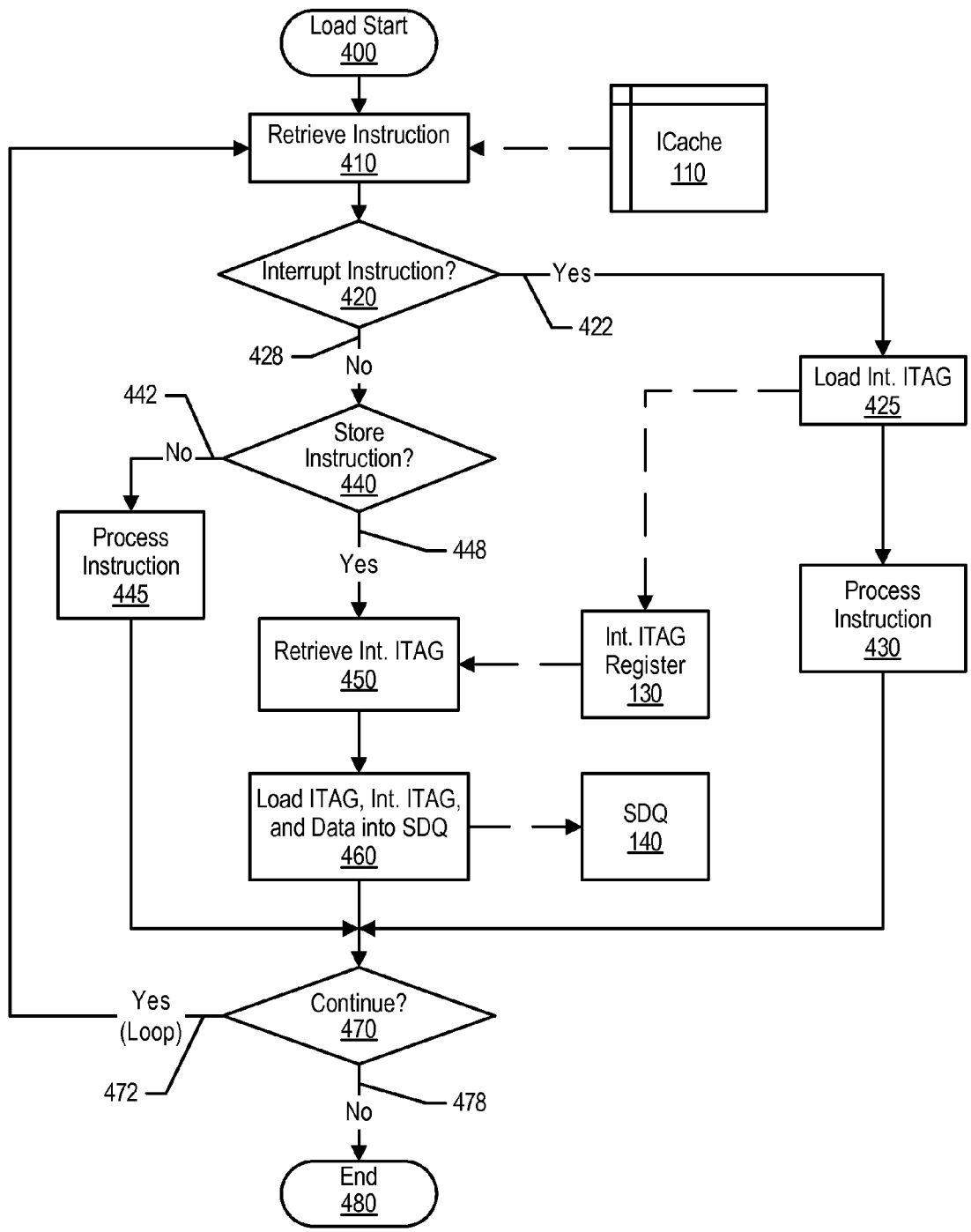
FIG. 4 is a flowchart showing steps taken in identifying interruptible instructions, loading their corresponding instruction tags into an interruptible instruction tag register, and loading subsequent instructions, along with a corresponding interruptible instruction tag, into a store data queue entry.

FIG. 4 is a flowchart showing steps taken in identifying interruptible instructions, loading their corresponding instruction tags into an interruptible instruction tag register, and loading subsequent instructions, along with a corresponding interruptible instruction tag, into a store data queue entry.

Processing commences at 400, whereupon processing retrieves an instruction from instruction cache (Icache) 110 at step 410. At step 420, a determination is made as to whether the retrieved instruction is an interruptible instruction, such as a branch instruction or a trap instruction (decision 420). If the retrieved instruction is an interruptible instruction, decision 420 branches to "Yes" branch 422 whereupon processing loads the retrieved instruction's instruction tag into interruptible instruction tag register 130 at step 425. For example, if the retrieved instruction's instruction tag is "5," processing loads "5" into interruptible instruction tag register 130. At step 430, processing processes the instruction. Icache 110 and interruptible instruction tag register 130 are the same as that shown in FIG. 1.

On the other hand, if the retrieved instruction is not an interruptible instruction, decision 420 branches to "No" branch 428 whereupon a determination is made as to whether the retrieved instruction is a store instruction (decision 440). If the retrieved instruction is not a store instruction, decision 440 branches to "No" branch 442 whereupon processing processes the instruction at step 445.

On the other hand, if the retrieved instruction is a store instruction, decision 440 branches to "Yes" branch 448 whereupon processing retrieves an interruptible instruction tag from interruptible instruction tag register 130 at step 450. The interruptible instruction tag corresponding to an instruction that was processed prior to the retrieved instruction. At step 460, processing loads the retrieved instruction's instruction tag, the interruptible instruction tag, and store data into a store data queue entry located in store data queue 140 (see FIGS. 2, 3, and corresponding text for further details regarding store data queue entries). Store data queue 140 is the same as that shown in FIG. 1.

A determination is made as to whether to continue instruction loading and execution processing (decision 470). If processing should continue, decision 470 branches to "Yes" branch 472, which loops back to retrieve and process more instructions. This looping continues until processing should terminate, at which point decision 470 branches to "No" branch 478 whereupon processing ends at 480.

Figure 5:
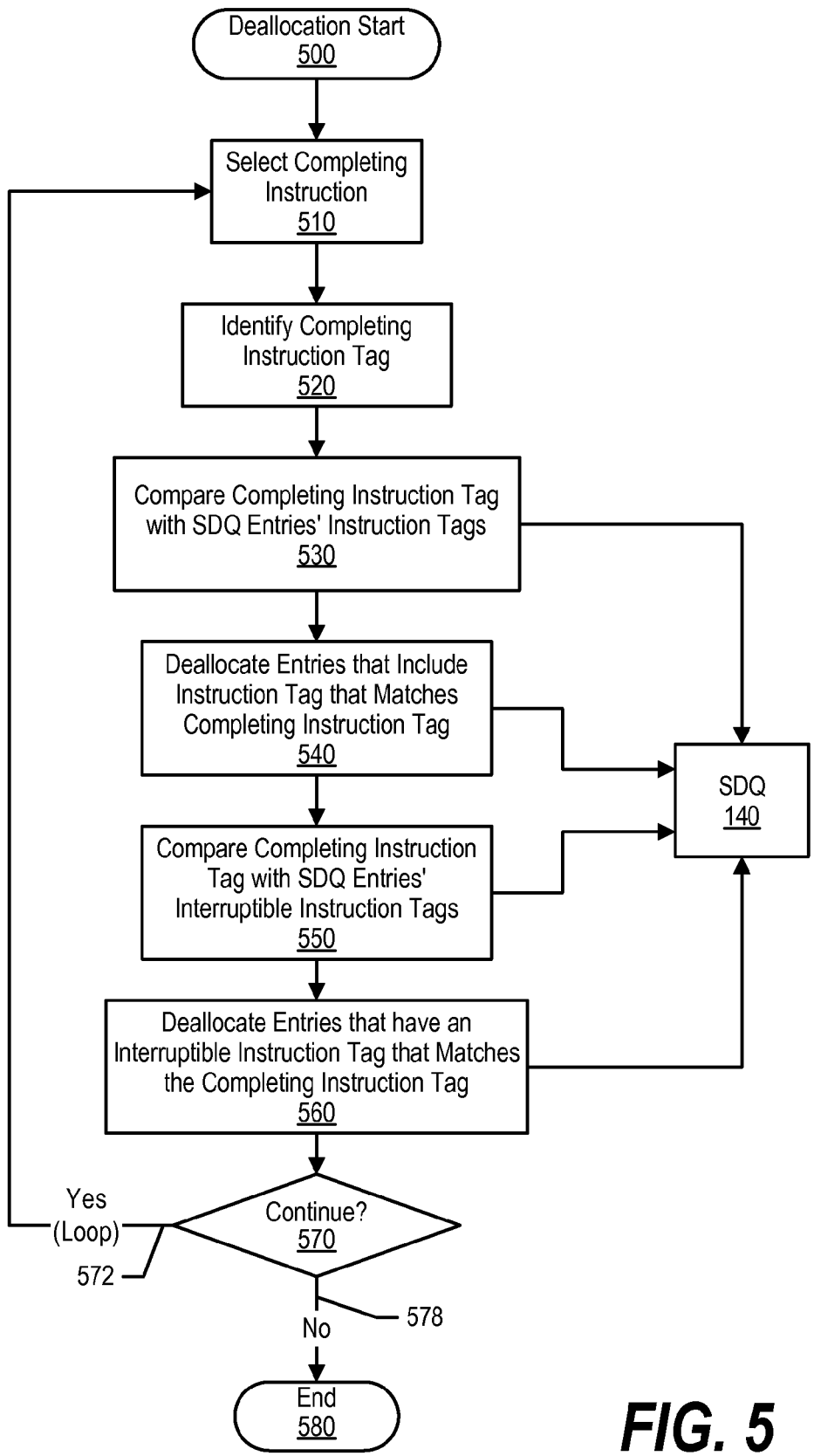
FIG. 5 is a flowchart showing steps taken in deallocating store data queue entries that include an interruptible instruction tag that matches a completing instruction tag.

FIG. 5 is a flowchart showing steps taken in deallocating store data queue entries that include an interruptible instruction tag that matches a completing instruction tag. Processing commences at 500, whereupon processing selects a next instruction to complete (step 510). At step 520, processing identifies the completing instruction's instruction tag (i.e. completing instruction tag).

Processing compares the completing instruction tag with instruction tags included store data queue entries located in store data queue 140 (step 530). Processing performs this comparison in order to identify one or more store data queue entries that correspond to the completing instruction and, therefore, may be deallocated. At step 540, processing deallocates the store data queue entries that include an instruction tag matching the completing instruction tag, thereby freeing up the store data queue entries for subsequent instructions.

At step 550, processing compares the completing instruction tag with interruptible instruction tags included in the store data queue entries located in store data queue 140 (step 550). For example, a store data queue entry may include an instruction tag of "6" and an interruptible instruction tag of "5." In this example, instruction "6" may be flushed out by the outcome of instruction "5." (see FIG. 3 and corresponding text for further details).

When a store data queue entry includes an interruptible instruction tag that matches the completing instruction tag, processing deallocates the store data queue entry at step 560. This is due to the fact that since the interruptible instruction completes, the particular store data queue entry is no longer interruptible and, therefore, may be deallocated.

A determination is made as to whether processing should continue (decision 570). If processing should continue, decision 570 branches to "Yes" branch 572, which loops back to continue to select and process completing instructions. This looping continues until processing should terminate, at which point decision 570 branches to "No" branch 578 whereupon processing ends at 580.

Figure 6:
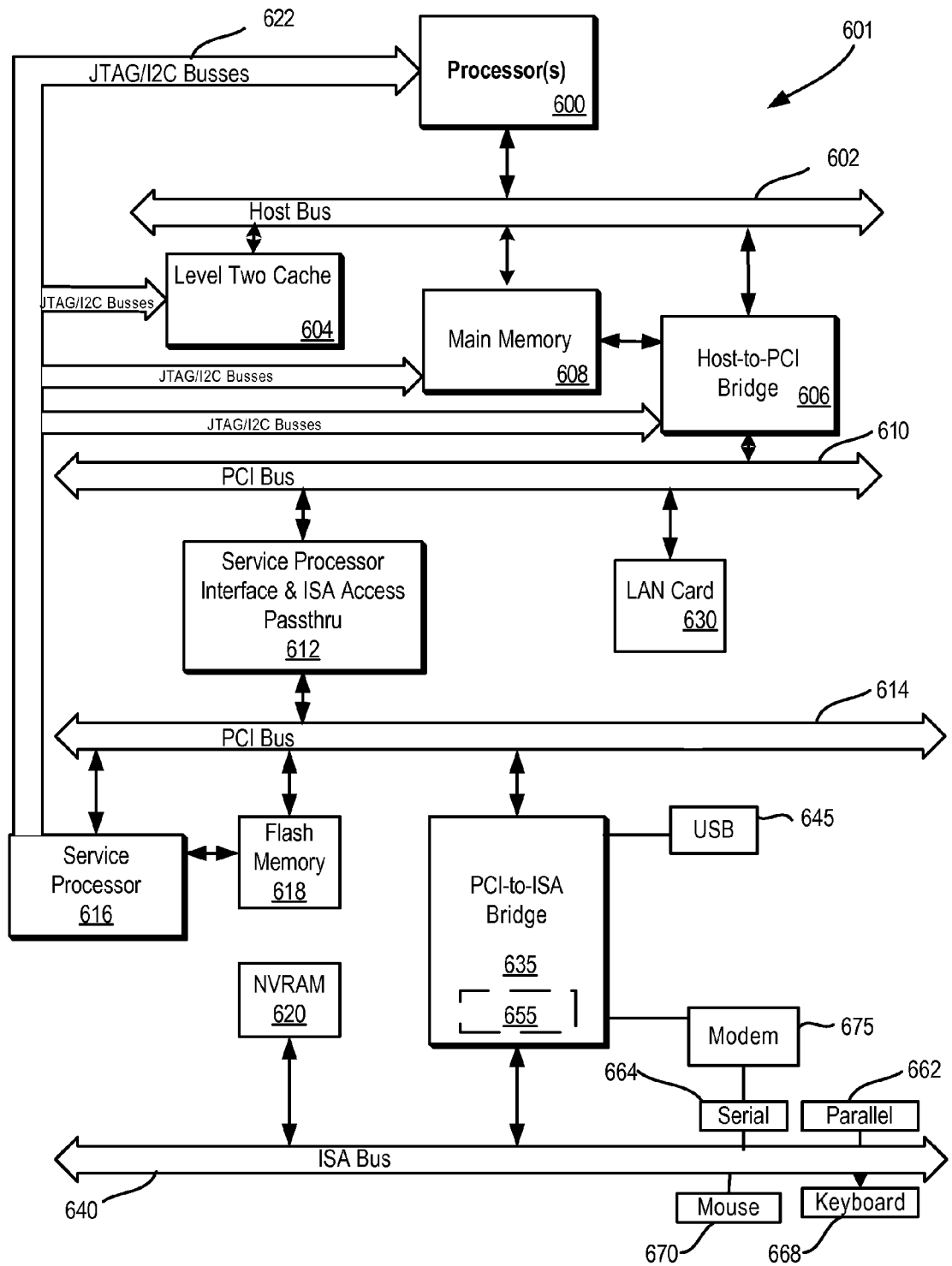
FIG. 6 is a block diagram of a computing device capable of implementing the present invention.

FIG. 6 illustrates information handling system 601 which is a simplified example of a computer system capable of performing the computing operations described herein. Computer system 601 includes processor 600 which is coupled to host bus 602. A level two (L2) cache memory 604 is also coupled to host bus 602. Host-to-PCI bridge 606 is coupled to main memory 608, includes cache memory and main memory control functions, and provides bus control to handle transfers among PCI bus 610, processor 600, L2 cache 604, main memory 608, and host bus 602. Main memory 608 is coupled to Host-to-PCI bridge 606 as well as host bus 602. Devices used solely by host processor(s) 600, such as LAN card 630, are coupled to PCI bus 610. Service Processor Interface and ISA Access Pass-through 612 provides an interface between PCI bus 610 and PCI bus 614. In this manner, PCI bus 614 is insulated from PCI bus 610. Devices, such as flash memory 618, are coupled to PCI bus 614. In one implementation, flash memory 618 includes BIOS code that incorporates the necessary processor executable code for a variety of low-level system functions and system boot functions.

PCI bus 614 provides an interface for a variety of devices that are shared by host processor(s) 600 and Service Processor 616 including, for example, flash memory 618. PCI-to-ISA bridge 635 provides bus control to handle transfers between PCI bus 614 and ISA bus 640, universal serial bus (USB) functionality 645, power management functionality 655, and can include other functional elements not shown, such as a real-time clock (RTC), DMA control, interrupt support, and system management bus support. Nonvolatile RAM 620 is attached to ISA Bus 640. Service Processor 616 includes JTAG and I2C busses 622 for communication with processor(s) 600 during initialization steps. JTAG/I2C busses 622 are also coupled to L2 cache 604, Host-to-PCI bridge 606, and main memory 608 providing a communications path between the processor, the Service Processor, the L2 cache, the Host-to-PCI bridge, and the main memory. Service Processor 616 also has access to system power resources for powering down information handling device 601.

Peripheral devices and input/output (I/O) devices can be attached to various interfaces (e.g., parallel interface 662, serial interface 664, keyboard interface 668, and mouse interface 670 coupled to ISA bus 640. Alternatively, many I/O devices can be accommodated by a super I/O controller (not shown) attached to ISA bus 640.

In order to attach computer system 601 to another computer system to copy files over a network, LAN card 630 is coupled to PCI bus 610. Similarly, to connect computer system 601 to an ISP to connect to the Internet using a telephone line connection, modem 665 is connected to serial port 664 and PCI-to-ISA Bridge 635.

While FIG. 6 shows one information handling system that employs processor(s) 600, the information handling system may take many forms. For example, information handling system 601 may take the form of a desktop, server, portable, laptop, notebook, or other form factor computer or data processing system. Information handling system 601 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   selecting a first instruction that is completing an execution process, wherein the first instruction is a first interruptible instruction and is selected from the group consisting of a branch instruction and a trap instruction;
   identifying a completing instruction tag corresponding to the first instruction;
   selecting a store data queue entry that is stored in a store data queue and includes an interruptible instruction tag, wherein the store data queue entry corresponds to a second instruction, which is a store instruction, and is subsequent in code to the first instruction and is dependent upon a result of the completion of the first instruction;
   comparing the completing instruction tag with the interruptible instruction tag; and
   in response to the comparing, deallocating the store data queue entry based upon the completing instruction tag matching the interruptible instruction tag.

2. The method of claim 1 wherein, prior to the selecting of the first instruction, the method further comprises:
   dispatching the first instruction;
   in response to the dispatching, determining that the first instruction is the first interruptible instruction; and
   in response to the determination, loading a first interruptible instruction tag corresponding to the first instruction in an interruptible instruction tag register.

3. The method of claim 2 further comprising:
   selecting the second instruction subsequent to the first instruction, the second instruction including instruction data;
   retrieving the first interruptible instruction tag from the interruptible instruction tag register; and
   storing the instruction data and the first interruptible instruction tag in one of the store data queue entries included in the store data queue.

4. The method of claim 2 further comprising:
   identifying a second interruptible instruction;
   loading a second interruptible instruction tag corresponding to the second interruptible instruction in the interruptible instruction tag register.

5. The method of claim 1 further comprising:
   in response to the deallocation, storing data included in the store data queue entries whose interruptible instruction tag matches the completing instruction tag.

6. A computer program product stored on computer memory, the computer memory containing instructions for execution by a computer, which, when executed by the computer, cause the computer to implement a method to deallocate one or more store data queue entries, the method comprising:
   selecting a first instruction that is completing an execution process, wherein the first instruction is a first interruptible instruction and is selected from the group consisting of a branch instruction and a trap instruction;
   identifying a completing instruction tag corresponding to the first instruction;
   selecting a store data queue entry that is stored in a store data queue and includes an interruptible instruction tag, wherein the store data queue entry corresponds to a second instruction, which is a store instruction, and is subsequent in code to the first instruction and is dependent upon a result of the completion of the first instruction;
   comparing the completing instruction tag with the interruptible instruction tag; and in response to the comparing, deallocating the store data queue entry based upon the completing instruction tag matching the interruptible instruction tag.

7. The computer program product of claim 6 wherein, prior to the selecting of the first instruction, the method further comprises:
   dispatching the first instruction;
   in response to the dispatching, determining that the first instruction is the first interruptible instruction; and
   in response to the determination, loading a first interruptible instruction tag corresponding to the first instruction in an interruptible instruction tag register.

8. The computer program product of claim 7 wherein the method further comprises:
   selecting the second instruction subsequent to the first instruction, the second instruction including instruction data;
   retrieving the first interruptible instruction tag from the interruptible instruction tag register; and
   storing the instruction data and the first interruptible instruction tag in one of the store data queue entries included in the store data queue.

9. The computer program product of claim 7 wherein the method further comprises:
   identifying a second interruptible instruction;
   loading a second interruptible instruction tag corresponding to the second interruptible instruction in the interruptible instruction tag register.

10. The computer program product of claim 6 wherein the method further comprises:
    in response to the deallocation, storing data included in the store data queue entries whose interruptible instruction tag matches the completing instruction tag.

11. An information handling system comprising:
    one or more processors;
    a memory accessible by the processors;
    one or more nonvolatile storage devices accessible by the processors; and
    a set of instructions stored in the memory, wherein one or more of the processors executes the set of instructions in order to perform actions of:
        selecting a first instruction that is completing an execution process, wherein the first instruction is a first interruptible instruction and is selected from the group consisting of a branch instruction and a trap instruction identifying a completing instruction tag corresponding to the first instruction;
        selecting a store data queue entry that is stored in a store data queue and includes an interruptible instruction tag, wherein the store data queue entry corresponds to a second instruction, which is a store instruction, and is subsequent in code to the first instruction and is dependent upon a result of the completion of the first instruction;
        comparing the completing instruction tag with the interruptible instruction tag; and
        in response to the comparing, deallocating the store data queue entry based upon the completing instruction tag matching the interruptible instruction tag.

12. The information handling system of claim 11 wherein, prior to the selecting of the first instruction, further comprises an additional set of instructions in order to perform actions of:
    dispatching the first instruction;
    in response to the dispatching, determining that the first instruction is the first interruptible instruction; and
    in response to the determination, loading a first interruptible instruction tag corresponding to the first instruction in an interruptible instruction tag register.

13. The information handling system of claim 12 further comprising an additional set of instructions in order to perform actions of:
    selecting the second instruction subsequent to the first instruction, the second instruction including instruction data;
    retrieving the first interruptible instruction tag from the interruptible instruction tag register; and
    storing the instruction data and the first interruptible instruction tag in one of the store data queue entries included in the memory.

14. The information handling system of claim 12 further comprising an additional set of instructions in order to perform actions of:
    identifying a second interruptible instruction;
    loading a second interruptible instruction tag corresponding to the second interruptible instruction in the interruptible instruction tag register.

* * * * *